(12) United States Patent
Bergboer et al.

(10) Patent No.: US 8,849,038 B2
(45) Date of Patent: *Sep. 30, 2014

(54) RANK-BASED IMAGE PILING

(71) Applicant: Google Inc., Mountain View, CA (US)

(72) Inventors: Niek Bergboer, Zurich (CH); Jonah Jones, Sydney (AU); Frederik Schaffalitzky, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,692

(22) Filed: Jan. 21, 2014

(65) Prior Publication Data

US 2014/0133756 A1 May 15, 2014

Related U.S. Application Data

(63) Continuation of application No. 13/397,973, filed on Feb. 16, 2012, now Pat. No. 8,660,358.

(60) Provisional application No. 61/444,375, filed on Feb. 18, 2011.

(51) Int. Cl.
*G06K 9/46* (2006.01)
*G06K 9/62* (2006.01)

(52) U.S. Cl.
CPC .................................. *G06K 9/6201* (2013.01)
USPC ........... 382/190; 382/154; 382/199; 382/240; 382/276; 382/325; 715/246; 345/629; 358/1.18

(58) Field of Classification Search
CPC ...................................................... G06K 9/66
USPC ................. 382/190, 154, 199, 240, 176, 325; 715/246; 345/629; 358/1.18
See application file for complete search history.

(56) References Cited

U.S. PATENT DOCUMENTS

| 8,175,340 | B2 | 5/2012 | Tsutsui | |
|---|---|---|---|---|
| 2007/0103480 | A1* | 5/2007 | Suzuno et al. | 345/582 |
| 2008/0088707 | A1* | 4/2008 | Iwaki et al. | 348/208.1 |
| 2012/0113475 | A1 | 5/2012 | Sugiyama | |
| 2012/0162249 | A1 | 6/2012 | Tsuda | |
| 2012/0204101 | A1 | 8/2012 | Yoshida | |

\* cited by examiner

*Primary Examiner* — Mike Rahmjoo
(74) *Attorney, Agent, or Firm* — Lerner, David, Littenberg, Krumholz & Mentlik, LLP (57) ABSTRACT

Methods, systems, and apparatus, including computer programs encoded on a computer storage medium, for selectively providing images. In one aspect, a method includes receiving image data that specify feature values for a plurality of images. The image data include, for each image, location data that specify a geographic location for the image. A group of images in which each image has location data specifying a geographic location that is within a threshold distance of a reference location are selected. Pairs of matching images are selected from the group of images. A reference image for the geographic location is selected from the pairs of matching images. Data that cause presentation in a map space of a photo collection image that includes a visual representation of the reference image are provided. The photo collection image is presented in the map space and at a map position for the geographic location.

20 Claims, 5 Drawing Sheets

RANK-BASED IMAGE PILING

CROSS-REFERENCE TO RELATED APPLICATIONS

This application is a continuation and claims the benefit of U.S. patent application Ser. No. 13/397,973, titled "RANK-BASED IMAGE PILING," filed on Feb. 16, 2012, which claims the benefit under 35 U.S.C. §119(e) of U.S. Patent Application No. 61/444,375, titled "RANK-BASED IMAGE PILING," filed Feb. 18, 2011. All subject matter set forth in the above referenced applications is hereby incorporated by reference into the present application as if fully set forth herein.

BACKGROUND

This specification relates to data processing and image analysis.

The Internet facilitates access to a wide variety of resources. For example, audio resources, image resource, video resources, and web pages that may include interactive elements can be accessed over the internet. A map portion (i.e., a portion of a map) is a particular type of interactive element that can be included in a web page (or another resource). For example, a web page can include code that causes a map portion to be presented in a map space (i.e., a portion of the web page in which the map portion is presented). A user can interact with the web page and/or the map portion, for example, to request presentation of a particular map location (e.g., a city or latitude/longitude combination) in a map space. The user can also interact with the web page, for example, to adjust a scale at which the map portion is presented in the map space.

Some web page publishers enable users to selectively request additional information that is associated with (i.e., indexed according to and/or stored with a reference to) geographic locations that are represented in the map portion. For example, a web page with which a map portion is presented can also include user interface elements that enable a user to request presentation of traffic conditions, live camera feeds, or images that have been identified as relevant to the geographic locations that are represented in the map portion. In response to the request, information (e.g., traffic indicators, live video, and/or images) can be presented over the map portion. However, as the amount of information presented over the map portion increases, the map portion can become cluttered.

SUMMARY

In general, one innovative aspect of the subject matter described in this specification can be embodied in methods that include the actions of receiving image data that specify feature values for a plurality of images and location data that specify a geographic location for each of the images; selecting a group of images in which each image has a geographic location that is within a threshold distance of a reference location; selecting pairs of matching images from the group of images, each selection being based on a pair of matching images having an image similarity score that meets a similarity threshold, the similarity score for each pair being based, at least in part, on the feature values of each image in the pair of images; selecting, from the pairs of matching images, a reference image for the geographic location, the reference image being selected based, at least in part, on a number of the matching pairs that include the reference image; determining an image effect to use when presenting the reference image, the image effect determined based on the number of matching pairs; and providing data that cause presentation in a map space of a photo collection image that includes a visual representation of the reference image, the photo collection image being presented with the determined image effect, and the photo collection image being presented in the map space and at a map position for the geographic location. Other embodiments of this aspect include corresponding systems, apparatus, and computer programs, configured to perform the actions of the methods, encoded on computer storage devices.

These and other embodiments can each optionally include one or more of the following features. Selecting a reference image for the geographic location can include selecting, from the pairs of images, the reference image based at least in part on user feedback data specifying popularity scores for images in the pairs. Selecting a reference image for the geographic location can include the actions of ranking the images in the pairs based on the popularity scores, the rank of each image being proportional to the popularity score for the image; and selecting the reference image based on the ranking.

Providing data that cause presentation of the photo collection image can include providing data that cause presentation of a photo collection image in which a number of photos visually represented by the photo collection image is proportional to the number of pairs that include the reference image. Selecting a group of images can include selecting different groups of images based on a zoom level at which a map portion will be presented in the map space, wherein the threshold distance of the reference location is proportional to a size of a geographic region that is represented by the map portion. Selecting a reference image can include selecting a reference image for each of a plurality of different geographic locations, the different geographic locations for which a reference image is selected being based, at least in part, on a zoom level at which the map portion will be presented.

Methods can further include the action of selecting the geographic locations to prevent overlap of two or more reference images in the map space. Selecting the geographic locations can include the actions of determining, for each geographic location that is specified by the location data, a number of pairs of matching images for the geographic location; ranking, for each geographic location that is specified by the location data, the geographic locations based on the number of pairs of matching images; and selecting, for each geographic location that is specified by the location data, one or more of the geographic locations based on the ranking. Methods can further include the actions of receiving from a user device, a request for a map space, wherein providing the data comprise providing the data to the user device.

Particular embodiments of the subject matter described in this specification can be implemented so as to realize one or more of the following advantages. The relevance of images that are selected by a computer for presentation in a map space can be increased by selecting, from among a set of images that are associated with a geographic location, an image that is visually similar to a highest number of other images in the set. A map space can be de-cluttered by limiting the number of images that are presented in the map space, thus lessening the distraction caused by displaying multiple images in juxtaposition in the map space. A relative number of images of a particular object can be indicated by a relative height of a photo collection image that is presented with a reference image, thus allowing a user to discern the number of images in the collection without having to select the collection. The images in each collection can be selected based on visual similarity, and a top photo representing the collection coveys to the user the types of images in the collection. Accordingly, each collection may better satisfy the user's informational needs that a collection of photos based solely on, for example, location or category classification.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, systems and apparatus for selecting, grouping and ranking images for geographical display (e.g., for presentation in a map portion). In some implementations, image data are received for a set of images. The set of images can be, for example, images that have been uploaded by users to a photo sharing application. The image data for each of the images include location data that specify a geographic location ("geolocation") for the image. For example, a user that uploads a photo to the photo sharing application may include a reference to a geolocation (e.g., latitude/longitude coordinates, a postal code, a city name, or another geographic identifier) at which the photo was taken. Using the location data, a collection of images that have been identified as relevant to a particular geolocation, can be selected.

The images that were selected for inclusion in the collection of images can be ranked based on their similarity to other images in the collection of images. For example, pairs of matching images can be identified based on feature values (i.e., values representing visual features) of each image. In some implementations, the image that is included in the most pairs of matching images is selected as a reference image for the geographic location area and is selected as a highest-ranked image. In turn, the highest-ranked image in the collection of images can be selected as a reference image for the geolocation. The representative image can be, for example, an image of a landmark, business, or other objects that are located at the geolocation.

When a request for a map portion that includes a particular geolocation is received, one or more of the images in the collection for that particular geolocation can be selected to be provided with the requested map portion. The number of images that are provided with the requested map portion can depend, for example, on display characteristics (e.g., display resolution, map space dimensions, zoom settings, and other display characteristics) of the environment in which the map portion will be presented. When fewer than the total number of images in the collection will be provided with the map portion, the collection of images can be represented by a photo collection image (e.g., an image representing a stack of images and the highest ranked image on the top of the stack). In some implementations, the highest-ranked image in the collection of images is visually presented as being placed on top of a stack of other images.

For example, when a map portion includes a densely-photographed geolocation, such as the area surrounding the Eiffel Tower in Paris, the map portion may become cluttered if all of the photos taken near the Eiffel Tower are provided with the map portion. In this example, the representative image of the area may be a particular photo of the Eiffel Tower, such that this particular photo of the Eiffel Tower is presented as being on top of a stack of photos, and displayed in the map space of a map application or browser.

Images are a particular type of content item that can be provided with a resource. A content item is a unit of content that is provided with and/or presented with a resource. The description that follows describes an environment in which images are distributed with online maps over the Internet. However, the description that follows is also applicable to other types of content items that are distributed in other online environments. As used throughout this document, the term image (e.g., reference image) refers to a representation of an image (e.g., an original representation of a reference image, a scaled version of the image, a lower/higher resolution version of the image, or an otherwise modified version of the image). As used throughout this document, a photo collection image can include (or not include) a representation of a reference image and can include an image effect that is based, at least in part, on a number of matching images for the reference image.

Figure 1:
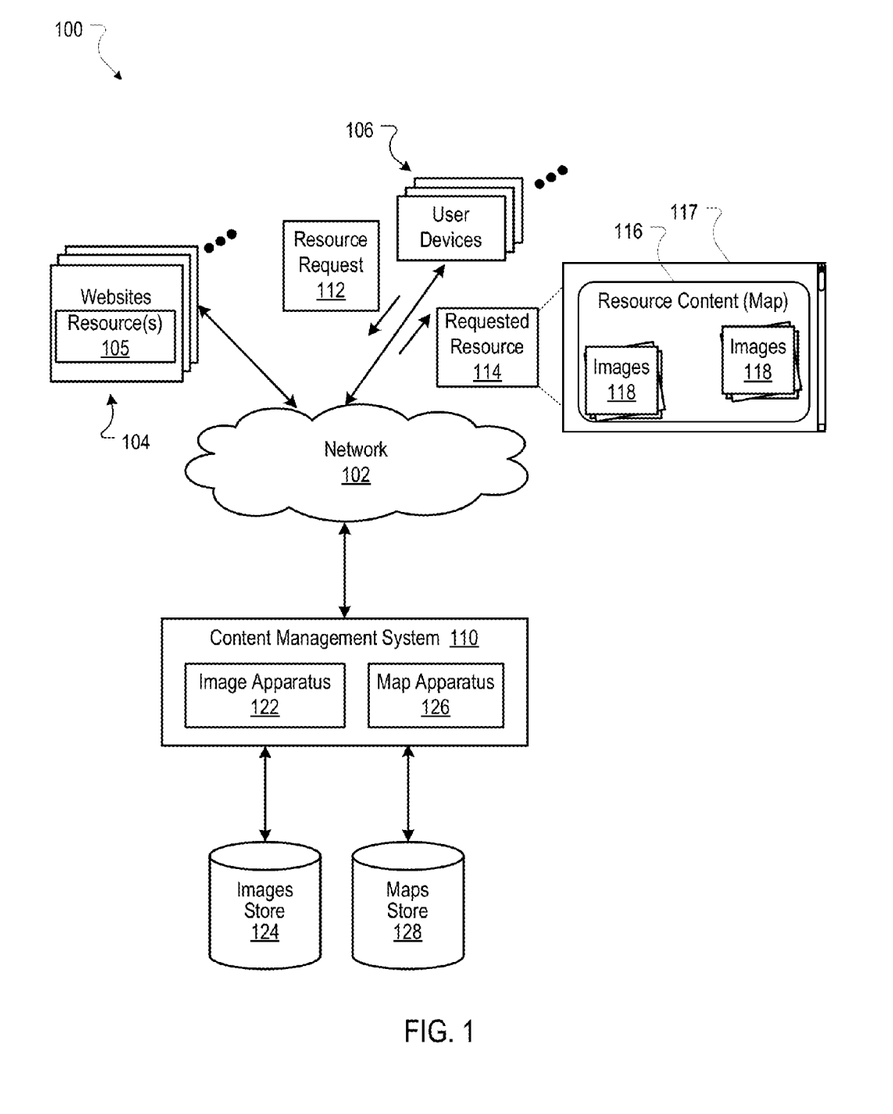
FIG. 1 is a block diagram of an example environment in which a content management system manages content distribution.

FIG. 1 is a block diagram of an example environment 100 in which a content management system 110 manages content distribution. The content that is distributed in the environment 100 can include map-related content, web pages, images, advertisements, or other types of content. The example environment 100 includes a network 102, such as a local area network (LAN), a wide area network (WAN), the Internet, or a combination thereof. The network 102 connects websites 104, user devices 106, and the content management system 110. The example environment 100 may include many thousands of websites 104, and user devices 106.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. For example, a user device 106 can be a mobile telephone running a Wireless Application Protocol (WAP) browser, or another type of user device (either mobile or non-mobile) running a different application, and so on.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a search results page in which search results are presented, or another resource 105. The data representing the requested resource 114 can include data that cause presentation of resource content 116 at the user device.

One example of resource content 116 is content used by a web browser 117 executing a map application that includes a map space displaying a map portion and images 118 (e.g., photos) that have been identified as relevant to geolocations on maps that are represented by the map space. The images 118 can be single images or collections of images of the same object (e.g., a stack of images of the Eiffel Tower). The data representing the requested resource 114 can also include data specifying a portion of the resource or a portion of a user display (e.g., a presentation location of a pop-up window or in a portion of a web page) in which the map space is presented.

In some implementations, part or all of a stack of images can be displayed in a partially transparent way. For example, the features of the top or reference image can be visible at the same time that some of the map detail (e.g., lines, roads, text, etc.) beneath the stack of images is also partially visible. In some implementations, transparency aspects of the display can automatically adjust to the visual content of the image and the map detail that is underneath.

The content management system 110 can comprise one or more servers (or another data processing apparatus) and/or one or more computer applications. The services of the content management system 110 are accessible (e.g., by browsers on user devices 106) using the network 102. In some implementations, some functionality of the content management system 110 can be included in web browsers.

The content management system 110 includes an image apparatus 122 that provides access to an image store 124. The image store 124 can store images (e.g., images 118) that have been provided by users to a photo-sharing application for presentation in publicly available map portions. For example, images that are stored in the image store 124 can be images (e.g., photos) that the users have requested be shared with other users. Images can also be provided by other parties, e.g., by owners or administrators of landmarks, etc. The images can be required to satisfy certain criterion before they are selected for use with the map, including content appropriateness and usage rights. Further, the images can be restricted to images for which location data (e.g., data that specify a relevant geographic location for the image) have been provided by the user who contributed or shared the image. For example, an image that is included in the image store 124 can be a photo of the Eiffel Tower that a tourist contributed, and for which the tourist provided a geolocation (e.g., either manually or automatically by use of the tourist's camera) at which the photo was taken.

The image store 124 can also include data that specify feature values for the images. The feature values for each image are values indicative of visual features of the image. For example, the feature values of an image may be values resulting from feature detection techniques such as edge detection, scale-invariant feature transform, ridge detection, and can also be values that represent colors of the images textures of the image and other visual features of the image. The feature values for each image can be arranged into a vector of feature values, and the similarity of a pair of images can be determined based on a distance between the vectors of feature values for the pair of images. The similarity of the pair of images can be represented by a similarity score (e.g., based on a cosine similarity measure, clustering techniques, or other vector similarity measurement techniques) that is computed using the sectors of feature values for the pair of images, stored in the image store 124, and used to identify matching image pairs. The image store 124 also includes data representing the image itself, as well as any metadata or other information associated with the image. Data that are associated with a particular image in the image store 124 are indexed according to and/or stored with data that reference the particular image.

In some implementations, users can upload images (e.g., photos of the Eiffel Tower) to various webs sites (e.g., photo sharing websites) and provide authorization to make the images publicly available. In some implementations, the image store 124 can logically represent a group of image clearinghouses or repositories that are accessible by the image apparatus 122. For example, some users may upload images to website A, and other users to website B, and the image apparatus 122 can locate those images regardless of their storage location. In some implementations, the content management system 110 can receive and store images that are uploaded by users.

Part or all of the image apparatus 122 can include one or more image servers, either local to, or remote from, the content management system 110. In some implementations, part or all of the image apparatus 122 can include one or more computer software modules, including application program interfaces (APIs) that provide access to the images servers and/or the image store 124. Other implementations can use other ways of accessing images.

The image apparatus 122 can generate and maintain one or more indices of images that are stored in various remote locations, and the indices can identify the geographic location (e.g., latitude/longitude or some other coordinate system) associated with each image.

The content management system 110 also includes a map apparatus 126 for accessing map data in a maps data store 128. The map apparatus 126 can include one or more map information servers (or another data processing apparatus) and/or one or more computer applications that are accessible to the content management system 110. As such, the map apparatus 126 and the maps data store 128 can be local to the content management system 110, or remote from the content management system 110 and accessible using the network 102.

The maps data store 128 can store data needed to respond to a map request that requests presentation of a map portion (i.e., a portion of a map). For example, in response to a resource request 112 for a map portion that is received by the content management system 110, map data that are received from the maps data store 128 can be used to render one or more requested map portions. In some implementations, the map requests includes data that specify display characteristics for the environment in which the map portion will be presented. For example, the map requests may specify a display resolution, zoom level, and map space dimensions.

These display characteristics may be used, for example, to select a map portion that is to be provided in response to the request. Additionally, these display characteristics may be used to determine a number of images that will be presented with the map portion. For example, the number of images may be selected so that no reference images in the map space overlap and/or so that specify areas of the map portion (e.g., road names) are occluded by the images that are provided with a map portion.

In one example of a request for map and image information that can occur in the environment 100, the content management system 110 can receive a resource request 112 that originates from the user device 106. The resource request 112 can include a request to display a map portion that includes an area of Paris that includes the location of the Eiffel Tower. In some implementations, the resource request 112 can be based on information (e.g., a search query) that the user enters in a browser, and/or the resource request 112 can be based on location information inferred by the user's current geographic location (e.g., based on GPS capabilities of a mobile user device 106 that have been enabled by the user).

In response to the resource request 112, the content management system 110 can access maps data store 128 to obtain map data that are responsive to the request (e.g., map data for the area of Paris near the Eiffel Tower). The content management system 110 can also receive image data to select images 118 that will be provided in response to the resource request 112. For example, the content management system 110 can receive image data for a reference image of the Eiffel Tower and/or other reference images having location data that specify a geolocation that is included in the requested map portion.

The content management system 110 can provide data (e.g., map data and image data) that cause presentation of the requested resource 114 to the user device 106. Upon receipt of the data, the user's browser, for example, can render the resource content 116 (e.g., the map of Paris) and display the corresponding images 118 at various places on the displayed map (e.g., next to the geographic locations in the map portion to which the images have been identified as relevant based on location data for the images). When many photos for a location are available (e.g., for a photo collection for the Eiffel Tower), the image apparatus 122 selects the reference image for a photo collection and generates data for a visual representation of a stack of photos with a representation of the reference image on the top of the stack of photos. Selection of the stack of photos at the user device results in the providing of one or more of the photos in the collection to the user device.

Figure 2:
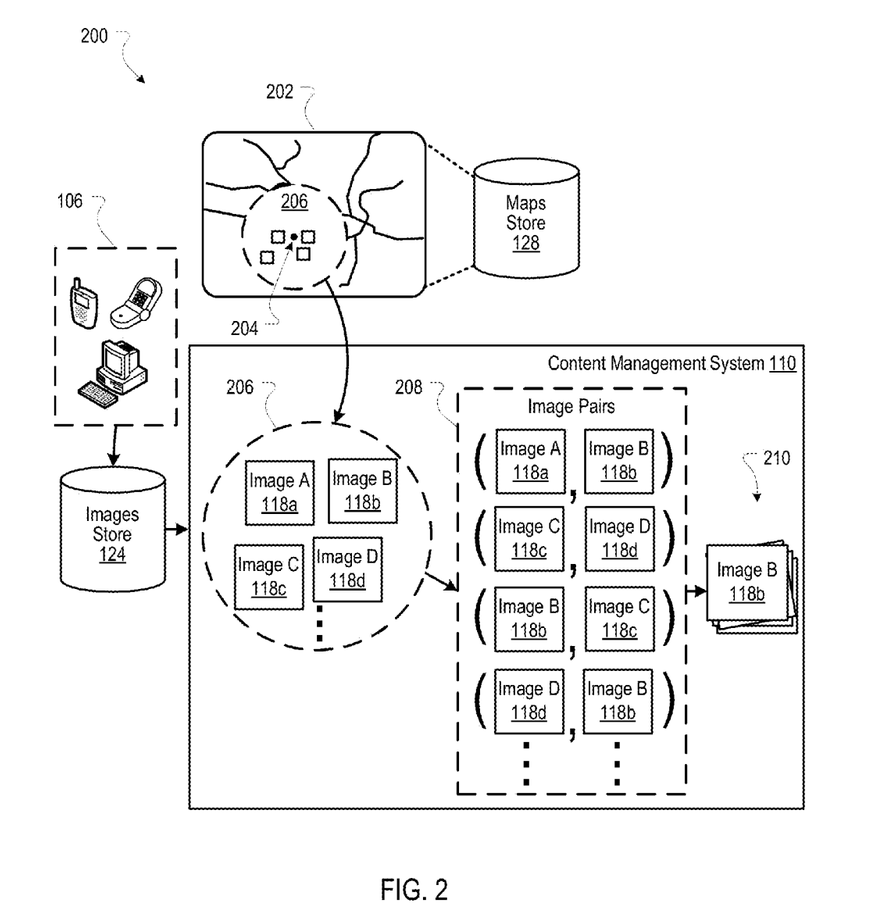
FIG. 2 is a block diagram showing an example data flow for displaying images with a map portion.

FIG. 2 is a block diagram showing an example data flow 200 for displaying images with a map portion. As an example, referring to FIG. 1, a user device 106 can make a content request 112, such as a request for map data that cause presentation of a map of Paris and images of points of interest (e.g., points of interest, businesses, etc.) in the area represented by the map. For example, the user may be planning a vacation to Paris, and entered, in a browser, search terms related to Paris. In another example, the user may be located in Paris, and the user's location (e.g., according to GPS data) can be included in the content request 112. In either example, when the map is displayed on the user device 106, images obtained from the image store 124 can be displayed with the map. The images can include, for example, images uploaded and authorized for sharing by other users, such as from other user devices 106.

The content management system 110 accesses image data for images that have been identified as being relevant to the geographic area that is represented by the requested map portion. For example, if the requested map portion represents an area 202 in Paris, then the image data that the content management system 110 accesses can include images 118a-118d of the Eiffel Tower, images of the Arc de Triomphe, and other images that are associated with the area (e.g., based on location data for the images). The image data obtained for the images 118a-118d, for example, can include, for each image, location data that specify a geographic location for the image.

In some implementations, prior to receiving the content request 112, the content management system 110 can group images, such as the images 118a-118d, in groups of one or more. As an example, the content management system 110 can select a group of images 118a-118d for which the location data associated with the images 118a-118d specifies a geographic location that is within a threshold distance of a reference location. For example, based on a geographic location 204 (e.g., a geographic point in Paris) the content management system 110 can select the images 118a-118d because they are geographically associated with locations that are within a certain pre-determined distance of the geographic location 204, as represented by a circle 206. The images 118a-118d can be a subset of what may be hundreds of images in the circle 206.

The reference location can be selected, for example, to be the centroid of the city, a geolocation of a landmark, or another point of reference. In some implementations, the reference location can be selected based on a number of available images that include location data specifying a particular geolocation. For example, the reference location can be a latitude/longitude pair that is associated with a highest number of images.

The threshold distance can be selected, for example, based on an image density measure (e.g., a number of images that are associated with an area of a map portion), a maximum number of images that can be presented in a map portion, and/or display characteristics of the environment in which the images will be presented. In some implementations, the threshold distance can be inversely proportional to a zoom level at which a map portion is presented. For example, as the zoom level is increased (i.e., the map portion is presented at a larger scale), the threshold distance can be decreased since a larger portion of the display area (i.e., relative to lower zoom levels) will be available for presentation of images that are located within a particular area of the map portion.

In some implementations, the content management system 110 can identify matching image pairs 208 (i.e., pairs of matching images) from the group of images. For example, the matching image pairs 208 can include a matching image pair that includes images 118a and 118b, another matching image pair that includes images 118c and 118d, another matching image pair that includes images 118b and 118c, and still another matching image pair that includes images 118d and 118b. The matching image pairs 208 can also include other combinations of images 118a-118d and combinations of images not represented in FIG. 2.

The content management system 110 can identify matching image pairs, for example, based on an image similarity score for the image pair. For example, the pair of images 118a and 118b may have an image similarity score that meets a similarity threshold, such that the content management system 110 can determine that the images 118a and 118b are images of the same object. The similarity score for the images 118a and 118b, for example, can be based, at least in part, on the feature values of each image in the pair of images, as described above. Some computer vision techniques can detect similarities between images that are scaled, rotated, or discolored. For example, epipolar geometry techniques can be used to determine that images of the Eiffel Tower that were captured at different distances from the Eiffel Tower and/or from different viewing angles are images of the same object.

The content management system 110 can select, from the matching image pairs, a reference image 118*b* for the geographic location 204. In some implementations, the content management system 110 selects, as the reference image, an image that was included in a highest number of identified matching image pairs. For example, when the geographic location 204 is a point in Paris near the Eiffel Tower, the content management system 110 may determine that a particular image of the Eiffel Tower (e.g., image 118*b*) was included in the most matching image pairs for the geographic location 204. Based on this determination, the content management system 110 can select the particular image of the Eiffel Tower as the reference image for the geographic location 204.

In some implementations, the content management system 110 can select the reference image based, at least in part, on user feedback data specifying popularity scores for the images. Example user feedback data can specify a number of users who have viewed the images, ratings that the users provided after viewing the images, and other indicia of popularity. In some implementations, information regarding user feedback for images can be stored in and/or received from the image store 124. For example, user feedback data can be indexed according to and/or stored with a reference to a particular image.

In some implementations, selecting a reference image based on user feedback on images can comprise ranking the images based on the popularity scores (e.g., where the rank of each image is proportional to the popularity score for the image) and selecting the reference image based on the ranking. For example, while the image 118*b* may be selected as the reference image when considering only the number of matching image pairs in which the image 118*b* is included, considering user feedback for the images 118*a*-118*d* can cause a different image to be selected as the reference image. As a specific example, if the image 118*c* is significantly more popular with users than the images 118*b*, 118*a*, and 118*d*, then the user popularity of the image 118*c* can make it more likely that the content management system 110 selects the image 118*c* as the reference image.

The content management system 110 can group the image 118*b* with other images (e.g., images 118*a*, 118*c* and 118*d*) to create a collection of images 210. For example, the content management system 110 can provide the collection of images 210 for presentation in a map space at the user device 106. The collection of images 210, for example, can be presented as a photo collection image (e.g., an image effect that is a visual representation of a stack of photos). In some implementations, the reference image (e.g., the image 118*b*) can be presented as being on the top of a stack of photos in the photo collection image. In some implementations, the visual representation of the stack of photos (e.g., the number of photos that appear in the stack) can be proportional to the number of pairs that include the reference image. For example, the relative number of photos in the collection can be indicated by the number of edges of images (or photo likenesses) that protrude from the stack. The visual representation of the stack of photos is a type of image effect that can be used when presenting a reference image.

Figure 3:
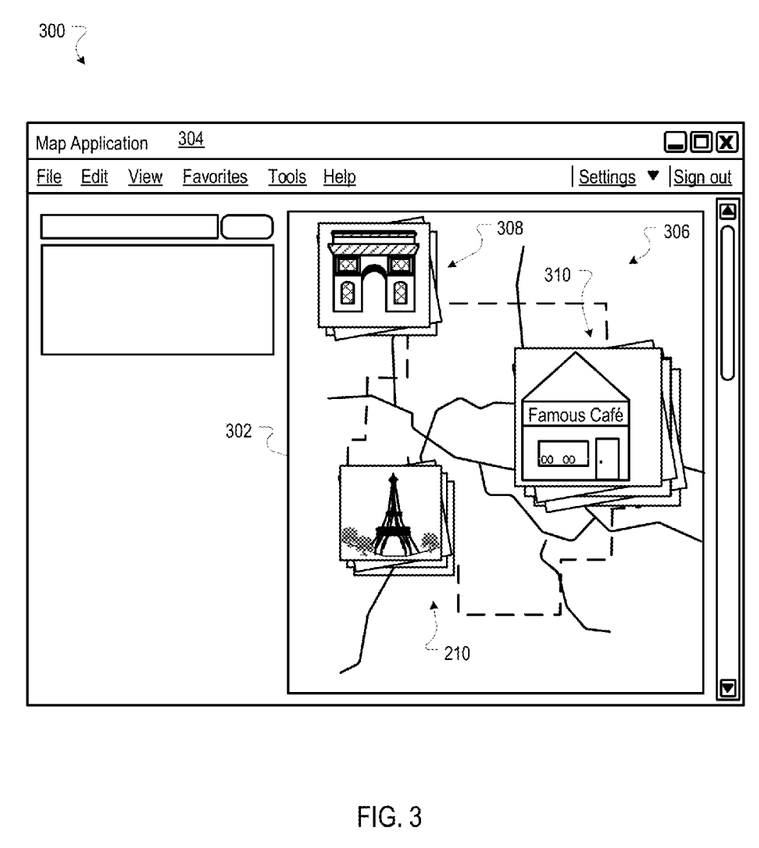
FIG. 3 is a screen shot of an example user interface that includes a map space.

FIG. 3 is a screen shot of an example user interface 300 that includes a map space 302. The map space 302 can be, for example, a map viewport or another section within a map application 304 or within a user's browser that operates on a user device 106.

The map space 302 can display a map portion which can include, for example, political boundaries, water features (e.g., oceans, lakes, rivers, etc.), roads and highways, transportation routes, satellite imagery, points-of-interest and other features, each of which can be labeled with text, markers and/or presented with various colors, styles, etc. The map data that are used to display this type of information can be obtained, for example, from the maps data store 128 of FIG. 1.

The map space 302 can also display images, including individual images and photo collection images, such as those representing the collection of images 210 that include the images 118*a*-118*d* representing various photos of the Eiffel Tower. Other collections of images can also be represented using individual images and photo collection images. For example, FIG. 3 includes representations of a collection of images 308 for the Arc de Triomphe and a collection of images 310 for the Famous Café.

In some implementations, collections of images, such as the collections of images 210, 308 and 310, can be visually represented by a reference image and a photo collection image icon. In some implementations, the photo collection image icon can be an image effect that depicts a slightly disarranged stack of photos with staggered edges showing at the outer edges of the collection image icon. The number of edges that are presented to the user can represent a relative number of individual images in the collection of images. For example, the collection image icon for the collection of images 210 has four edges showing, which can indicate that there are four (or a multiple of four) images in the collection of images 210. By comparison, the collection of images 308 has a photo collection image icon with three edges showing, which can indicate that there are three (or a multiple of three) images of the Arc de Triomphe in the collection of images 308. Further, the collection of images 310 has a photo collection image icon with six edges, which can indicate that six (or a multiple of six) images of the Famous Café are in the collection of images 310. In some implementations, and image count (i.e., a value indicative of the number of images in the collection of images) can be presented next to a visual representation of a collection of images or in the corner of the reference image.

In some implementations, a user can use one or more controls to cycle through the collection of images 210, e.g., to view each of the individual photos of the Eiffel Tower that are represented by the images 118*b*, 118*a*, 118*c* and 118*d*. For example, by repeatedly clicking on the collection of images 210, the user can view the next image (e.g., the image 118*a* "underneath" the image 118*b*), and the next image after that (e.g., the image 118*c*), and so on. The order in which the images are presented can be based, for example, on the order in which the images were ranked as described above, a semi-random image selection technique, or another technique for selecting a presentation order.

A list of viewing options can be displayed as a result of user interaction with a collection of images (e.g., hovering over or clicking on the collection of images 210, right-clicking on the collection of images 210, or some other user interaction). In some implementations, clicking on or selecting the reference image can cause the reference image to be enlarged and/or cause a display of information about the reference image (e.g., the date that the image was submitted).

In some implementations, the reference image, e.g., the image 118*b* representing the representative photo of the Eiffel Tower, can be annotated in some way, such as marked with a different (e.g., bolded) outline. In this way, the user can be reminded which image is the reference image.

Figure 4:
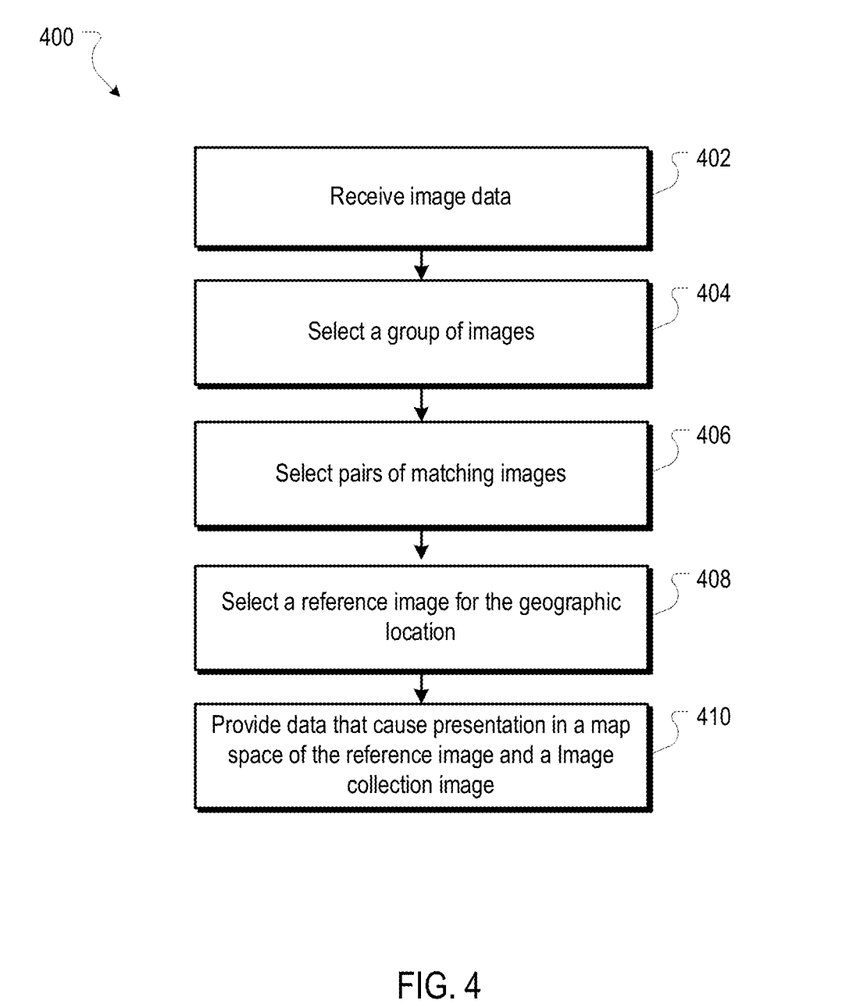
FIG. 4 is a flow chart of an example process for providing a collection of images for presentation in a map space.

FIG. 4 is a flow chart of an example process 400 for providing a collection of images for presentation in a map space. The process 400 is a process by which image data that specify feature values for multiple different images are received. A group of the images are selected based on location data that are associated with (i.e. indexed according to and/or stored with a reference to) the respective images. Matching image pairs are then selected from the group of images, and a reference image for the geographic location is selected from the matching image pairs. Data that cause presentation of the reference image and a photo collection image in the map space are provided.

The process 400 can be used, for example, to display one or more collections of images within the map space of a maps application and/or a browser. The process 400 can be implemented, for example, using the content management system 110 of FIG. 1. The process 400 can also be implemented as instructions stored on computer storage medium such that execution of the instructions by data processing apparatus cause the data processing apparatus to perform the operations of the process 400. FIG. 2 is used to provide examples in describing operations of the process 400.

Image data that specify feature values for multiple different images are received (402). As described above, the feature values for each image are values indicative of visual features (e.g., colors, textures, edges, or other visual features) of the image. In some implementations, the image data for each image include location data for the image. The location data specify a geographic location for the image. For example, the location data can specify latitude/longitude coordinates (or another reference to a geographic location) that was provided by a user that provided the image. The image data can be stored, for example, in the image store 122 of FIG. 1.

A group of images is selected using the image data (404). In some implementations, each image that is selected for inclusion in the group of images has location data specifying a geographic location that is within a threshold distance of a reference location. For example, with reference to FIG. 2, the content management system 110 can select the images 118*a*-118*d* for inclusion in a same group because the images are associated with geographic locations that are within the circle 206, e.g., within a pre-determined radius of the reference location 204. Selection of the reference location and/or the threshold distance can be performed as described above with reference to FIG. 2.

In some implementations, multiple different reference images (i.e., for multiple different geographic locations) can be provided with a single map portion. The different geographic locations for which a reference image is provided can be determined, for example, based on a zoom level (and/or graphic resolution) at which the map portion and reference images will be presented. For example, if the map portion that will be displayed on the user's user device represents all of Paris, then several geographic locations from around Paris can be selected, including the Eiffel Tower, the Arc de Triomphe, Sacre Coeur, Notre Dame de Paris, Famous Café, and several other sites, restaurants and places of interest can be selected. However, if the map to be displayed is zoomed into a relatively small section of Paris that includes the Eiffel Tower and nearby surroundings, then the content management system may select just a few geographic locations, including the Eiffel Tower and any popular restaurants or cafés that are near the Eiffel Tower.

When a smaller number of geographic locations are presented in the map space, it may be possible to present more than one reference photo for each of the geographic locations. For example, if the map space is presented at a zoom level such that only two blocks of Paris surrounding the Eiffel Tower are presented in the entire map space, it may be possible to present two or more different reference images at map space locations around the location of the Eiffel Tower. For example, a reference image that is presented at a map space location that is west of the location of the Eiffel Tower can be an image of the Eiffel Tower as viewed from a western perspective, while the reference image that is presented at a map space location that is east of the location of the Eiffel Tower can be an image of the Eiffel Tower as viewed from an eastern perspective.

In some implementations, the geographic locations can be selected to prevent overlapping of two or more reference images in the map space. For example, in an area that includes a famous museum, a popular restaurant and a tourist attraction that are all virtually at the same location (e.g., within a few hundred feet), the content management system 110 can select one of the three geographic locations. Doing so can prevent stacks of images from being displayed virtually on top of each other in a map space.

In some implementations, when more than one geographic location can be selected for a reference location, different techniques can be used to select one or more of the geographic locations over the remaining (un-selected) geographic locations. In some implementations, for each geographic location, a number matching image pairs for each geographic location can be determined. Then, the geographic locations can be ranked based on the number of matching image pairs, and the ranking can be used to selecting one or more of the geographic locations based on the ranking. For example, in a reference location in Paris that encompasses six geographic locations for which images have been received, the content management system 110 can select the three to four geographic locations that have the most matching image pairs (e.g., that may reflect the most popular locations determined by users over time).

Pairs of matching images are selected from the group of images (406). In some implementations, the selection of each matching image pair is based on an image similarity score for the matching image pair meeting a similarity threshold. The similarity score for a pair of images is based, at least in part, on the feature values of each image in the pair of images, as described above with reference to FIG. 2.

A reference image for the geographic location is selected from the pairs of matching images (408). In some implementations, the reference image is selected based, at least in part, on a number of the matching image pairs that include the reference image. For example, as described with reference to FIG. 2, the content management system 110 can select the image 118*b* as the reference image because the image 118*b* is included in more matching image pairs 208 than any of the other example images (e.g., images 118*a*, 118*c*, 118*d*). In this example, the image 118*b* is included in three image pairs, and the other images 118*a*, 118*c* and 118*d* are each included in just two image pairs.

In some implementations, a reference image can be selected based, at least in part, on user feedback data that specify popularity scores for images, as previously described with reference to FIG. 2. For example, the images can be ranked based on their popularity scores where the rank of each image is proportional to the popularity score for the image. In turn, the reference image can be selected based on the ranking. In some implementations, the reference image can be selected based on a function (e.g., a measure of central tendency such as an average or a weighted average, a logarithmic function, or another function) of the number of matching image pairs in which the image is included and the popularity score for the image.

Data that cause presentation of the reference image and a photo collection image in a map space are provided (410). In some implementations, the reference image and the photo collection image are presented at a map position for the geographic location that is specified by the location data for the reference image. For example, with reference to FIG. 2, the content management system 110 can provide data that can be used to display the collection of images 210 at a map location corresponding to the geographic location specified by the location data for the reference image 118b.

Figure 5:
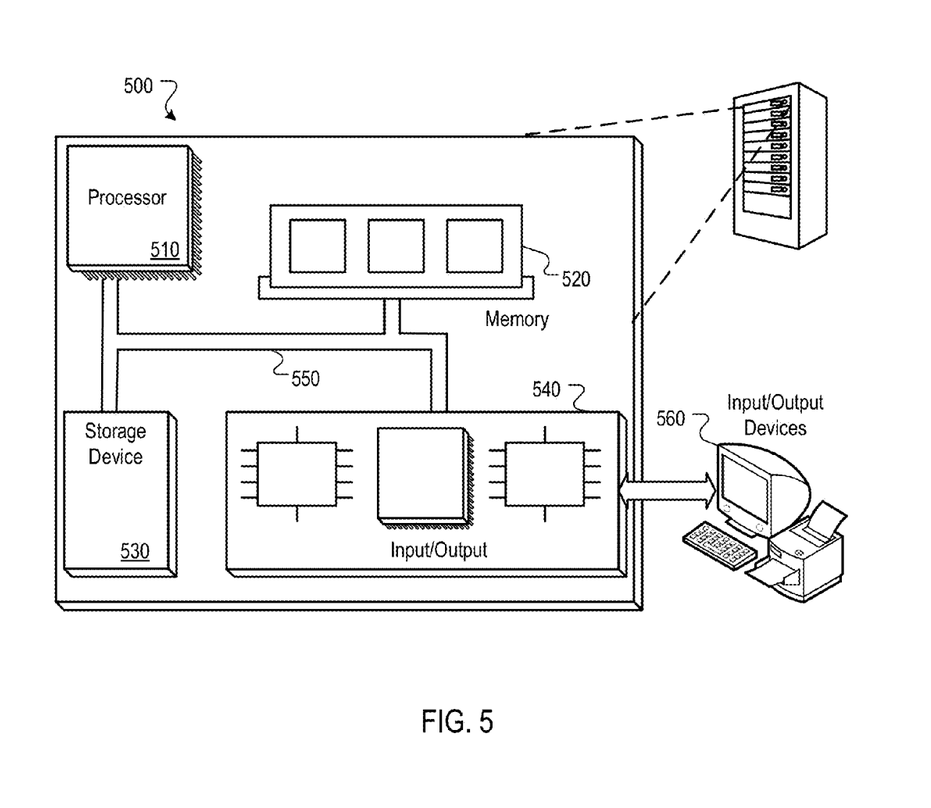
FIG. 5 is block diagram of an example computer system that can be used to provide images with a map portion.

FIG. 5 is block diagram of an example computer system 500 that can be used to provide images with a map portion, as described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    receiving, by one or more data processing apparatus, a plurality of images and location data that specify a geographic location associated with each of the images;
    selecting, by the one or more data processing apparatus and based on the location data, a group of images that are associated with a geographic location that is within a threshold distance of a reference location, wherein the threshold distance of the reference location is proportional to a size of a geographic region that is represented by a particular map portion;
    identifying, as a reference image for the reference location and by the one or more data processing apparatus, one of the images that has at least a threshold level of similarity relative to a highest number of other images in the group of images;
    determining, by the one or more data processing apparatus, an image effect to use when presenting the reference image, the image effect determined based on the highest number of other images; and
    providing, by the one or more data processing apparatus and for presentation in the particular map portion, a photo collection image that includes a visual representation of the reference image and a visual representation of a number of photos under the reference image, wherein the number of photos is proportional to the highest number of other images.

2. The method of claim 1, further comprising determining, for each of at least some of the images in the group of images, a measure of similarity between the image and other images in the group of images.

3. The method of claim 2, wherein determining the measure of similarity for each of at least some of the images in the group of images comprises determining the measure of similarity for each image based, at least in part, on a level of similarity between feature values of the image and features values of the other images in the group of images.

4. The method of claim 1, further comprising identifying a reference image for each of two or more additional geographic locations.

5. The method of claim 4, further comprising:
receiving a request for presentation of a map space that includes the particular geographic location;
determining, based on the request, a zoom level at which the map space will be presented;
determining, based at least in part on the zoom level, that the reference image for the reference location and the reference image for at least one of the additional geographic locations are capable of being presented in the map space without overlapping; and
providing the reference image for the reference location and the reference image for the at least one of the additional geographic locations for presentation with the map space.

6. The method of claim 1, wherein determining an image effect to use comprises determining a number of stacked images that will be depicted by the image effect, the number of stacked images being based, at least in part, on a number of images in the group of images.

7. The method of claim 1, further comprising:
identifying, in the group of images, pairs of matching images;
identifying, from the pairs of matching images, a particular image that is included in at least a highest number of the pairs of matching images, wherein:
identifying the reference image comprises identifying the particular image as the reference image.

8. A system comprising:
a data store storing a plurality of images and location data that specify a geographic location associated with each of the images; and
one or more data processing apparatus operable to interact with the data store and to perform operations including:
selecting, based on the location data, a group of images that are associated with a geographic location that is within a threshold distance of a reference location, wherein the threshold distance of the reference location is proportional to a size of a geographic region that is represented by a particular map portion;
identifying, as a reference image for the reference location, one of the images that has at least a threshold level of similarity relative to a highest number of other images in the group of images;
determining an image effect to use when presenting the reference image, the image effect determined based on the highest number of other images; and
providing, for presentation in the particular map portion, a photo collection image that includes a visual representation of the reference image and a visual representation of a number of photos under the reference image, wherein the number of photos is proportional to the highest number of other images.

9. The system of claim 8, wherein the one or more data processing apparatus are operable to perform operations further comprising determining, for each of at least some of the images in the group of images, a measure of similarity between the image and other images in the group of images.

10. The system of claim 9, wherein determining the measure of similarity for each of at least some of the images in the group of images comprises determining the measure of similarity for each image based, at least in part, on a level of similarity between feature values of the image and features values of the other images in the group of images.

11. The system of claim 8, wherein the one or more data processing apparatus are operable to perform operations further comprising identifying a reference image for each of two or more additional geographic locations.

12. The system of claim 11, wherein the one or more data processing apparatus are operable to perform operations further comprising:
receiving a request for presentation of a map space that includes the particular geographic location;
determining, based on the request, a zoom level at which the map space will be presented;
determining, based at least in part on the zoom level, that the reference image for the reference location and the reference image for at least one of the additional geographic locations are capable of being presented in the map space without overlapping; and
providing the reference image for the reference location and the reference image for the at least one of the additional geographic locations for presentation with the map space.

13. The system of claim 8, wherein determining an image effect to use comprises determining a number of stacked images that will be depicted by the image effect, the number of stacked images being based, at least in part, on a number of images in the group of images.

14. The system of claim 8, wherein the one or more data processing apparatus are operable to perform operations further comprising:
identifying, in the group of images, pairs of matching images;
identifying, from the pairs of matching images, a particular image that is included in at least a highest number of the pairs of matching images, wherein:
identifying the reference image comprises identifying the particular image as the reference image.

15. A non-transitory computer storage medium encoded with a computer program, the program comprising instructions that when executed by data processing apparatus cause the data processing apparatus to perform operations comprising:
receiving a plurality of images and location data that specify a geographic location associated with each of the images;
selecting, based on the location data, a group of images that are associated with a geographic location that is within a threshold distance of a reference location, wherein the threshold distance of the reference location is proportional to a size of a geographic region that is represented by a particular map portion;
identifying, as a reference image for the reference location, one of the images that has at least a threshold level of similarity relative to a highest number of other images in the group of images;
determining an image effect to use when presenting the reference image, the image effect determined based on the highest number of other images; and
providing, for presentation in the particular map portion, a photo collection image that includes a visual representation of the reference image and a visual representation of a number of photos under the reference image, wherein the number of photos is proportional to the highest number of other images.

16. The computer storage medium of claim 15, wherein the one or more data processing apparatus are operable to perform operations further comprising determining, for each of at least some of the images in the group of images, a measure of similarity between the image and other images in the group of images.

17. The computer storage medium of claim 16, wherein determining the measure of similarity for each of at least some of the images in the group of images comprises determining the measure of similarity for each image based, at least in part, on a level of similarity between feature values of the image and features values of the other images in the group of images.

18. The computer storage medium of claim 15, wherein the one or more data processing apparatus are operable to perform operations further comprising identifying a reference image for each of two or more additional geographic locations.

19. The computer storage medium of claim 18, wherein the one or more data processing apparatus are operable to perform operations further comprising:

receiving a request for presentation of a map space that includes the particular geographic location;

determining, based on the request, a zoom level at which the map space will be presented;

determining, based at least in part on the zoom level, that the reference image for the reference location and the reference image for at least one of the additional geographic locations are capable of being presented in the map space without overlapping; and providing the reference image for the reference location and the reference image for the at least one of the additional geographic locations for presentation with the map space.

20. The computer storage medium of claim 15, wherein determining an image effect to use comprises determining a number of stacked images that will be depicted by the image effect, the number of stacked images being based, at least in part, on a number of images in the group of images.

* * * * *